United States Patent [19]

Agusto et al.

[11] 3,865,884

[45] Feb. 11, 1975

[54] PREPARATION OF ORCINOL

[75] Inventors: Robert G. Agusto; Francis A. Taylor; Hartwell L. Briggs, all of Chicago, Ill.

[73] Assignee: Canadian Thermo Images, Ltd., Vancouver, British Columbia, Canada

[22] Filed: May 11, 1970

[21] Appl. No.: 36,419

[52] U.S. Cl...... 260/621 H, 260/468 K, 260/514 K, 260/586 R
[51] Int. Cl............................................ C07c 37/06
[58] Field of Search........ 260/598 R, 621 H, 586 R, 260/468 K, 514 K

[56] References Cited
UNITED STATES PATENTS 2,640,084   5/1953   Chitwood et al. .............. 260/621 H

OTHER PUBLICATIONS

Mukherji et al., "Jour. Org. Chem.," Vol. 1958, pp. 4770–4771.

Primary Examiner—Leon Zitver
Assistant Examiner—Norman Morgenstern

[57] ABSTRACT

A process for preparing 3,5-dihydroxytoluene in which an alkyl acetoacetate is reacted with an alkyl crotonate in the presence of a hydride to form a carboethoxymethyldihydroresorcinol; in which said carboethoxymethyldihydroresorcinol is saponified and decarboxylated (decarbalkoxylation) and acidified whereby methyldihydroresorcinol is obtained; and wherein said methyldihydroresorcinol is dehydrogenated in the presence of a dehydrogenation catalyst to form 3,5-dihydroxytoluene. 3,5-dihydroxytoluene has a number of uses including its use as a reagent for pentoses, lignin, beet sugar, saccharose, arabinose and diastase.

9 Claims, No Drawings

PREPARATION OF ORCINOL

BACKGROUND OF THE INVENTION

Orcinol or 3,5-dihydroxytoluene occurs naturally in many species of lichens. Methods for preparing synthetic orcinol have been known since at least 1945. Such methods, however, have not been entirely satisfactory. Most of such methods involve complicated procedural steps and do not produce satisfactory yields. Additionally, certain of the known methods require the use of reactants which are expensive as well as toxic and difficult to handle.

It is an object of the present invention to provide a simplified process for producing orcinol.

More specifically, it is an object of the invention to provide a process for producing orcinol which utilizes readily available and relatively inexpensive materials while still producing high yields.

BRIEF SUMMARY OF THE INVENTION

The invention comprises the discovery of a new process for producing 3,5-dihydroxytoluene (orcinol). In the process, an alkyl crotonate is reacted with an alkyl acetoacetate in the presence of a hydride such as sodium hydride to form a metal carboethoxymethyldihydroresorcinol. In the second step, the reaction product is saponified and decarboxylated to form methyldihydroresorcinol. Methyldihydroresorcinol is then dissolved in an inert solvent and dehydrogenated to form orcinol. The orcinol can be further purified or can be used directly, for example, to prepare p-orsellinic acid.

DETAILED DESCRIPTION OF THE INVENTION

The following is a flow sheet showing the preparation of orcinol:

Flow Sheet

Ethyl Crotonate          Ethyl Acetoacetate

NaH

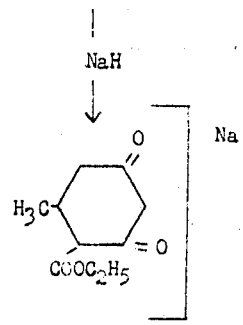

Product No. I (mol. wt. 222.0)

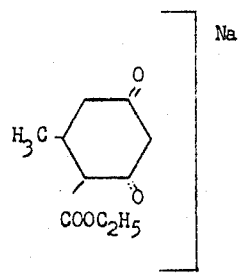        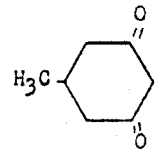

Product No. I

1. KOH
2. HCl

Product No. II (mol. wt. 126)

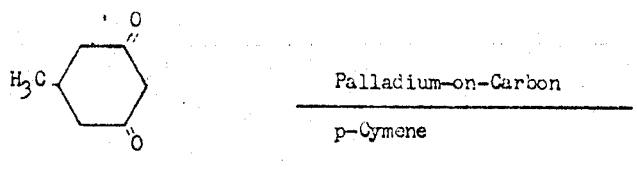    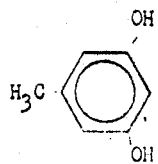

Palladium-on-Carbon p-Cymene

Product II                 Product III (mol. wt. 124)

It should be understood that a wide variety of crotonic and acetoacetic esters can be employed in the first reaction. Alkyl esters wherein the alkyl group contains 1 to 12 carbon atoms, preferably 1 to 4 carbon atoms, and especially ethyl esters have been found to be suitable. Likewise a wide variety of strongly basic materials can be used to cause the condensation reaction. In addition to hydrides, such as sodium hydride, materials such as sodium methylate, sodium ethylate, and the like, are effective. The selection of the particular basic material does not constitute a part of the present invention. Sodium hydride is preferred because of its low cost and ready availability. Sodium hydroxide can be used in place of potassium hydroxide in the decarbalkoxylation reaction. Similarly, many other acids could be used to cause the precipitation of methyldihydroresorcinol. In step No. 3, any solvent that is inert under the reaction conditions and which has a suitable boiling point can be used in place of p-cymene. A relatively high reflux temperature is desirable. Therefore, it is preferred to use a solvent having a boiling point of at least about 156°C. In addition to p-cymene, which has a boiling point of 176°C., such materials as phenyl ether, furfural, butyl cellosolve, etc., can be employed. In general, the solvent should be inert under the reflux conditions and should have a boiling point of between about 156° and 259°C.

Dehydrogenation catalysts other than palladium-on-carbon can be used in the process. Palladium-on-carbon, however, has been found to be particularly effective.

The following example illustrates the preparation of orcinol by the subject process.

EXAMPLE

Product No. 1 (sodium carboethoxymethyldihydroresorcinol) was prepared in a conventional three-liter, three-necked, round bottom flask fitted with a stirrer and a reflux condenser. In the flask was placed

| | |
|---|---|
| 260.20 grams (2 moles) | ethyl acetoacetate (B.P. 180.8°), and |
| 228 grams | ethyl crotonate (B.P. 138°). |

The resultant solution was vigorously stirred. Eighty-two grams (2 moles) of sodium hydride dissolved in mineral oil (50% solution by weight) was slowly added to the reaction mixture. After approximately a 40 gram quantity of sodium hydride was added the solution began to turn yellow. As the addition was continued, the reaction mixture became very thick and a vigorous stirring was required for the reaction to continue. A small amount of ethyl acetoacetate can be added to prevent the stirrer from stopping. After the addition of sodium hydride was completed the reaction mixture was allowed to cool to near room temperature (30° to 35°C.). Petroleum ether, B.P. 30° to 60°C., was then added slowly with stirring. After stirring the mixture for 2 hours the material was filtered and washed well with petroleum ether. The yellow product was then air dried. The yield was 300 grams (60% theory).

To produce Product No. 2 (methyldihydroresorcinol) the following materials were placed in a two-liter, three-necked round bottom flask fitted with a stirrer and condenser:

| | |
|---|---|
| 300 grams (1.35 moles) | sodium carboethoxymethyldihydroresorcinol (Product No. 1), and |
| 112.2 grams (2 moles) | of 86% potassium hydroxide dissolved in one liter of water. |

The reaction mixture was refluxed vigorously for one hour, whereupon 10 grams of Darco G–60 (activated carbon) was added. The reaction mixture was stirred for one-half hour and then passed through a suitable filter. The filtrate was placed in a three-liter beaker and heated. A 50% dilution of concentrated HCl was slowly added to acid pH. Vigorous evolution of carbon dioxide occurred near the end point. After the addition of HCl, the solution was cooled with ice water with stirring. The precipitate was filtered and air dried. The crude weight of the precipitate was 160 grams. The precipitate was then recrystallized from ethyl acetate. The yield was 130 grams (77% theory). The melting point of Product No. 2 was 127° to 129°C.

In preparing Product No. 2 it is not necessary to isolate Product No. 1. The potassium hydroxide can be added directly to the reaction mixture produced in step one.

Orcinol was prepared as follows from Product No. 3.

In a three-necked, 500 ml round bottom flask equipped with condenser, stirrer, and nitrogen inlet, the following materials were placed:

| | |
|---|---|
| 20 grams (.16 mole) | methyldihydroresorcinol (Product No. 2), and |
| 200 ml | p-cymene (an inert solvent). |

While heating in a mantle, 5.0 grams of 5% palladium-on-carbon catalyst was added to the solution as rapidly as possible. The reaction mixture was refluxed for 3 hours, the catalyst was filtered off and the reaction mixture was cooled in an ice bath. Cymene was decanted off and traces of cymene were stripped off under high vacuum. The yield of orcinol was 12 to 14 grams. This product can be further purified for sublimation or can be used as is for various purposes such as production of p-orsellinic acid.

Obviously many modifications and variations of the invention as hereinbefore set forth may be made without departing from the spirit and scope thereof, and therefore only such limitations should be imposed as are indicated in the appended claims.

We claim:

1. A process for preparing 3,5-dihydroxytoluene which comprises: condensing an alkyl crotonate with an alkyl acetoacetate, said alkyl groups containing from 1–12 carbon atoms, in the presence of a strong base selected from the group consisting of sodium hydride, sodium methylate and sodium ethylate to form the salt of a carboalkoxymethyldihydroresorcinol; refluxing said salt with an aqueous alkali metal hydroxide solution, recovering the hydrolysis product, heating said hydrolysis product in the presence of acid, cooling to form a precipitate, recovering said precipitate which is methyldihydroresorcinol; and subsequently dehydrogenating said methyldihydroresorcinol to form orcinol.

2. A process as in claim 1 wherein the alkyl group of said alkyl crotonate and said alkyl acetoacetate contains from 1 to 4 carbon atoms.

3. A process as in claim 1 wherein said methyldihydroresorcinol is converted to orcinol by heating a solvent solution of said methyldihydroresorcinol in the presence of a dehydrogenation catalyst, said solvent being inert and having a boiling point of at least 156°C.

4. A process as in claim 1 wherein said alkyl crotonate is ethyl crotonate.

5. A process as in claim 4 wherein said alkyl acetoacetate is ethyl acetate.

6. A process as in claim 3 wherein said catalyst is palladium-on-carbon.

7. A process as in claim 1 wherein said base is sodium hydride.

8. A process as in claim 3 wherein said solvent has a boiling point of from 156°C to 259°C.

9. The process set forth in claim 1 wherein said salt of a carboalkoxymethyldihydroresorcinol is treated with an acid and the resulting carboalkoxymethyldihydroresorcinol isolated prior to hydrolysis by refluxing with said alkali metal hydroxide solution.

* * * * *